Oct. 21, 1930.  E. W. DAVIS  1,778,936
LIQUID HANDLING MEANS
Filed March 18, 1926   2 Sheets-Sheet 1
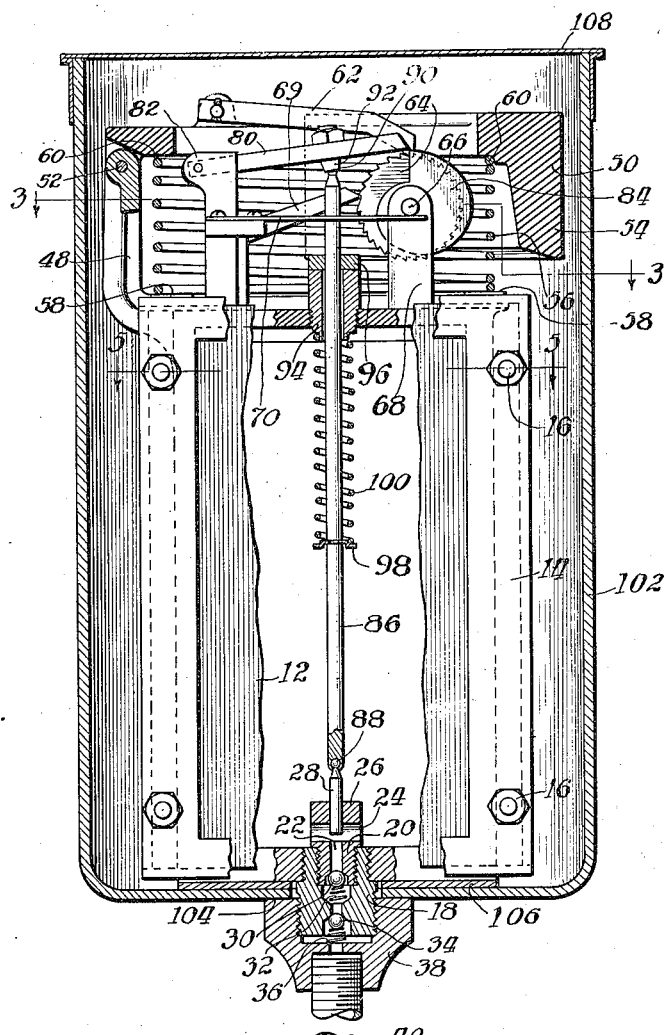
Fig. 1.
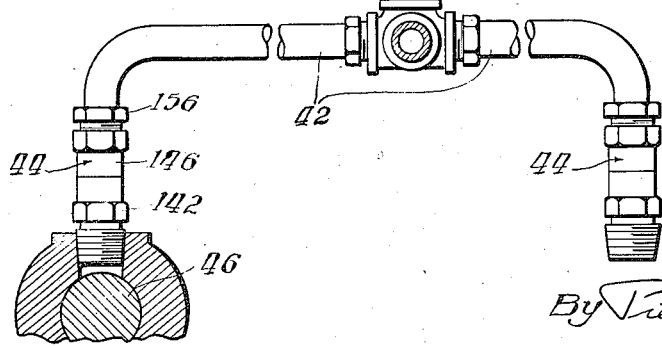
Inventor
Ernest W. Davis.
By Pierce and Sweet
attys.

Oct. 21, 1930.  E. W. DAVIS  1,778,936
LIQUID HANDLING MEANS
Filed March 18, 1926    2 Sheets-Sheet 2
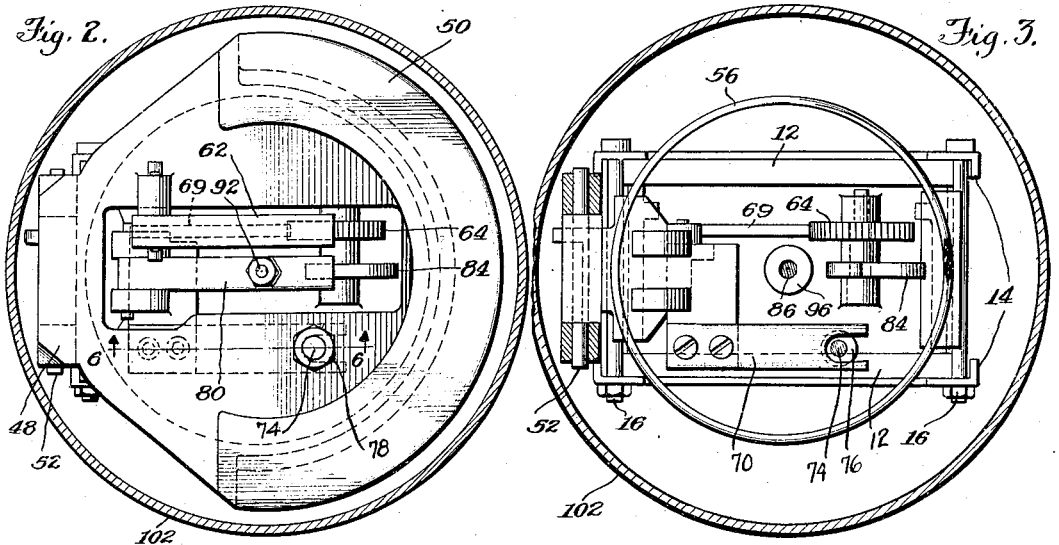
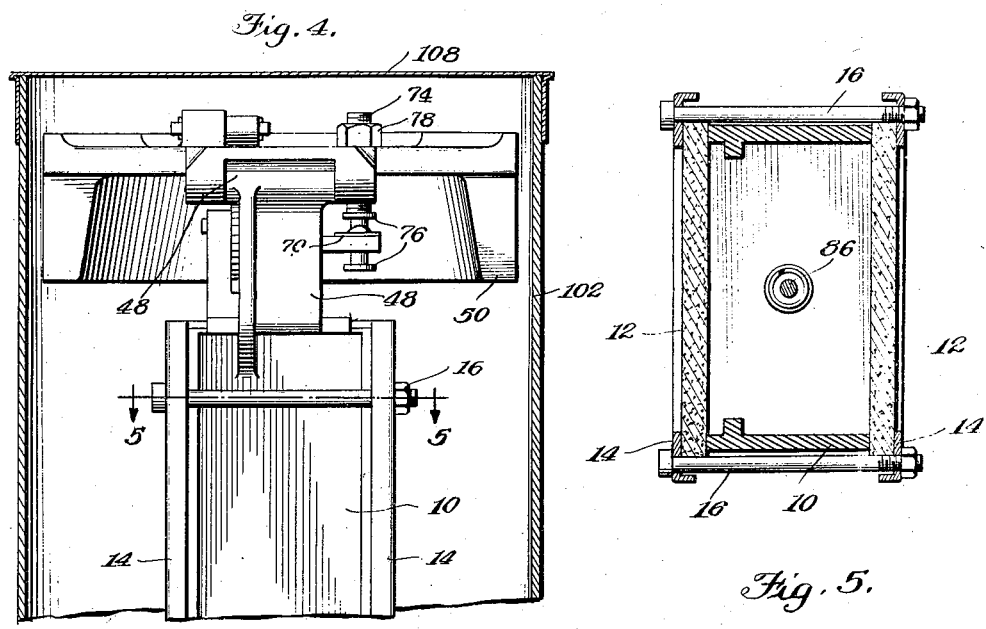
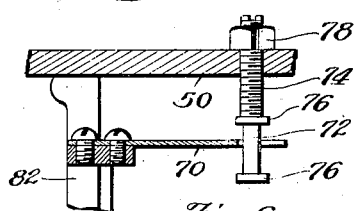
Inventor
Ernest W. Davis
By Pierce and Sweet
Attys.

Patented Oct. 21, 1930

1,778,936

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LIQUID-HANDLING MEANS

Application filed March 18, 1926. Serial No. 95,687.

My invention relates to liquid handling means and more specifically to an improved pump.

Among the objects and advantages of the invention may be enumerated:

First, certainty of operation in a vibration actuated power plant, with a movement of the transmission mechanism.

Second, a combined capacity to develop high pressure, and to operate at sufficiently short intervals to maintain a substantially constant delivery pressure in a distributing system of normal capacity connected to the pump.

Third, an improved transmission of power from the inertia operated power plant to the pump proper.

In the accompanying drawings:

Figure 1 is a central section through a power plant and pump according to the invention with a diagrammatic showing of a distributing system;

Figure 2 is a plan view of the power plant with the cover removed;

Figure 3 is a plan view with the weight removed, partly in section below said weight;

Figure 4 is an elevation of the power plant and its support from the pivot side;

Figure 5 is a section on line 5—5 of Figure 4; and

Figure 6 is a detail section on line 6—6 of Figure 2.

In the embodiment of the invention selected for illustration, a box frame 10 is provided, with its two largest sides left open, and closed in assembly by filters 12 clamped on by means of cover plates 14 and fastening bolts 16. The frame and filters together constitute a complete enclosure with the filters as the sole means of access thereto. In the bottom of the frame I fasten an outlet plug 18 supporting a smaller cylinder plug 20 containing the cylinder 22 to which access may be had through lateral ports 24. The plug extends above the ports to form a plunger guide 26 for the stub plunger 28.

The cylinder 22 is terminated at its lower end by enlarging the bore and closing the cylinder with a ball check valve 30 held in place by a spring 32. The outlet plug 18 forms a lower seat for the spring 32 and an upper seat for a second ball check valve 34 held in place by a spring 36 resting on the connecting cap 38. From the cap 38 any suitable connection 40 runs to a distributing system diagrammatically indicated by piping 42 leading to a plurality of terminals 44 illustrated as connected to machine bearings 46 to supply lubricant thereto.

A supporting arm 48 rises from one end of the top of the frame 10 for pivotally supporting a weight 50 by means of a pintle 52. The main portion of the weight 50 is concentrated in a flange 54 depending from a portion of the periphery opposite the pintle 52. A spring 56 is housed inside the flange 54, bearing on seats at 58 on the top of the frame 10 and at 60 against the under-surface of the weight. The weight is provided with a pawl and ratchet connection comprising the pawl 62 pivoted on the weight, and the ratchet 64, for connecting it to a countershaft 66 journaled in a standard 68. A check pawl 69 prevents any retrograde movement of the ratchet 64.

The oscillations of the weight are limited and cushioned by a bifurcated leaf spring 70 straddling the cylindrical end 72 of an adjusting screw rod 74 between the spaced abutments 76. The screw rod 74 is threaded through the weight 50 and locked in adjusted position by a lock nut 78.

The transmission from the shaft 66 to the plunger 28 comprises a lever 80 pivoted on the top of the same standard 82 used to support the leaf spring 70 and the check pawl 69, with its free end riding on a cam 84 on the shaft 66. The cam 84 is shaped to raise the lever slowly and drop it abruptly once during each revolution of the shaft 66.

A connector 86 is provided with a universal joint 88 to connect it to the plunger 28 and another universal joint 90 to connect it to the lever 80 preferably through the medium of the separate universal joint member 92 mounted on the lever 80 with provision for vertical adjustment with respect thereto.

To accommodate the movement of the connector 86, the top of the frame 10 is apertured and provided with a bushing 94 having sufficient lateral clearance to permit the limited lateral movement necessitated by the linkage employed. A sealing washer 96 has a loose sliding fit on the connector 86 and slides laterally on the top of the bushing 94. Between the bottom of the bushing and a suitable abutment at 98 on the connector 86 I position a compression coil spring 100 of small diameter. In one commercial device according to the invention, I have employed a spring 100, which, while the actual force generated is relatively small, is capable of developing a pressure of approximately one hundred pounds per square inch in the cylinder 22, due to the small area of the cylinder.

The frame 10 and the power plant on top of it are all set in a container 102 clamped at 104 between the cap 38 and the bottom of the frame, a packing gasket 106 being provided to assure a tight seal. The enclosure is completed at the top by a cover 108.

When the entire device is mounted on any support subject to either regular or irregular displacements in the general direction of the connector 86, the excursions of the weight 50 will drive the transmission to store energy in the spring 100 during one complete rotation of the shaft 66, which will be suddenly released, to produce a charge of material issuing from the cylinder 22 under a pressure as great as may be necessary to force the system to receive the same. More particularly, when the device is mounted on the body of a motor vehicle, and the vehicle driven over an ordinary road surface, the excursions of the weight will be sufficiently frequent and extensive to produce a stroke of the plunger every hundred yards or so. With a system of lubricating pipes 42 extending to all the chassis bearings requiring lubrication, the capacity of the piping system and the damping of the irregular movement therein due to the inertia and viscosity of the liquid, will be such that the fitting 44 will experience a substantially uniform pressure impulse. The same uniform delivery pressure would obviously obtain in any other receiving system having sufficient capacity or damping properties or both, and almost any ordinary receiving system for the output of such a pump can readily be designed to have sufficient capacity for this purpose.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. A pump comprising a plunger, guide and ported cylinder means for said plunger, a housing for said plunger and said guide and cylinder means, said housing having a portion thereof forming a strainer for admitting liquid, an inertia motor external to said housing, an operative connection between said motor and said plunger extending through an opening in said housing, and a cover slidable on said connection and overlying said opening.

2. A pump comprising a plunger, guide and ported cylinder means for said plunger, a housing for said guide and cylinder means, a portion of the wall of said housing constituting a filter for admitting liquid, a driving mechanism outside of said housing, a member connecting said plunger and driving mechanism, said member projecting through an aperture in said housing, and means slidable relative to said member and covering said aperture to prevent passage of foreign matter therethrough.

3. A pump comprising a plunger, a fixed guide and ported cylinder means therefor, a connector articulated at one end to said plunger, drive means moving the other end of said connector both parallel to said plunger and laterally, spring means acting on said connector intermediate its end for biasing the parts in one direction, abutment means for said spring, said spring and abutment means encircling said connector and having lateral clearance to permit movement of said connector.

4. A pump comprising a plunger, a fixed guide and ported cylinder therefor, a connector articulated at one end to said plunger, drive means moving the other end of said connector both parallel to said plunger and laterally, spring means acting on said connector intermediate its ends for biasing parts in one direction, abutment means for said spring, said spring and abutment means encircling said connector, a cover slidable axially of said connector and laterally over said abutment to maintain a seal, a complete enclosure for said plunger and guide and cylinder means, said abutment lying in one wall of said enclosure, and filter means establishing communication with said enclosure, said cylinder and said filter means constituting the sole communication between said enclosure and the outside.

5. A pump comprising a plunger, a fixed guide and ported cylinder therefor, a connector articulated at one end to said plunger, drive means moving the other end of said connector both parallel to said plunger and laterally, spring means acting on said connector intermediate its ends for biasing parts in one direction, abutment means for said spring, said spring and abutment means encircling said connector, a cover slidable axially of said connector and laterally over said abutment to maintain a seal, a complete enclosure for said plunger and guide, said abutment lying in one wall of said enclosure, and filter means constituting the sole inlet to said enclosure.

6. Pumping equipment comprising an enclosure having a portion of the walls thereof forming a liquid strainer, a pump within and adjacent the bottom of said enclosure for ejecting the contents thereof, motor means outside of and on top of said enclosure, an operative mechanical connection between said motor means and said pump, means for maintaining a seal where said connection passes into said enclosure, and a liquid container secured to said enclosure and forming a housing for said enclosure and said motor means.

7. Pumping equipment comprising a box frame with an open side, a filter clamped over said open side to complete an enclosure, a pump in said enclosure at the bottom thereof for ejecting its contents, an inertia motor external to and above said enclosure, an oscillatory mechanical connection between said inertia motor and said pump, said connection extending through an aperture in said enclosure, and means for sealing the aperture in said enclosure.

8. Pumping equipment comprising a resiliently supported oscillating weight, a pump cylinder and plunger, a counter-shaft operatively connected to said plunger, means for storing energy by rotation of said shaft, and for releasing said energy once upon each revolution of said shaft, and a mechanical transmission comprising a single speed reduction between said weight and said shaft.

9. Pumping equipment comprising a frame, a cylinder and plunger at the bottom of said frame, a lever pivoted above said frame, a shaft, a cam on said shaft underlying said lever to lift the same and drop it suddenly once in each revolution, a resiliently supported oscillating weight above said frame, a direct step by step pawl and ratchet connection between said weight and said shaft, a connector having universal joints at its ends and connecting said plunger and lever, and resilient means acting on said connector and tensioned by lifting said lever, for storing energy and delivering it when said lever is dropped, to force said plunger into said cylinder.

10. Pumping equipment comprising a frame, a cylinder and plunger on said frame, a lever pivoted on said frame, a shaft, a cam on said shaft engaging said lever to deflect the same and release it suddenly once in each revolution, a resiliently supported oscillating weight above said frame, a drive connection between said weight and said shaft, a connector having universal joints at its ends and connecting said plunger and lever, and resilient means acting on said connection and tensioned by deflecting said lever, for storing energy and delivering it when said lever is released, to force said plunger into said cylinder.

11. Pumping equipment comprising a frame, a cylinder and plunger on said frame, a lever pivoted on said frame, a shaft, a cam on said shaft engaging said lever to deflect the same and release it suddenly once in each revolution, a resiliently supported oscillating weight above said frame, a drive connection between said weight and said shaft comprising a single speed reduction, and an operative connector between said lever and said plunger.

12. In a pump and reservoir assembly, the combination of a reservoir, a ported cylinder mounted within said reservoir and positioned adjacent the bottom thereof, a strainer surrounding said cylinder for filtering liquid upon its passage from said reservoir to said cylinder, a plunger reciprocable in said cylinder, a motor having a resiliently mounted inertia element, and a universal connection between said motor and said plunger.

13. In a pump and reservoir assembly, the combination of a reservoir, a pump cylinder positioned at the bottom thereof, a check valve normally closing one end of said cylinder, the other end of said cylinder being normally open, a plunger guided for reciprocatory movement into and out of said cylinder, an enclosure surrounding the open end of said cylinder, said enclosure having means for straining liquid passing from said reservoir to said cylinder, an inertia motor mounted in the upper end of said reservoir, and a universal connection between said motor and said plunger.

In witness whereof, I hereunto subscribe my name this 5th day of March, 1926.
ERNEST W. DAVIS.